(12) United States Patent
Dyer et al.

(10) Patent No.: US 6,386,258 B1
(45) Date of Patent: May 14, 2002

(54) TIRE HAVING A GEODESIC PLY AND A METHOD OF FABRICATING

(75) Inventors: Dale Kenneth Dyer, Uniontown; Randall Raymond Brayer, N Canton; Amit Prakash, Hudson, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/501,819

(22) Filed: Feb. 10, 2000

Related U.S. Application Data

(63) Continuation of application No. 09/077,642, filed as application No. PCT/US98/06301 on Mar. 27, 1998, now Pat. No. 6,068,721.

(51) Int. Cl.[7] .................................................. B60C 9/07
(52) U.S. Cl. ........................ 152/542; 152/554; 152/562
(58) Field of Search ............................... 152/554, 542, 152/539, 546, 548, 562, 552; 156/117, 132, 133, 134

(56) References Cited

U.S. PATENT DOCUMENTS

| | | | |
|---|---|---|---|
| 2,700,998 A | 2/1955 | Wallace | 152/356 |
| 3,058,509 A | 10/1962 | Maiocchi | 152/356 |
| 3,062,258 A | 11/1962 | Maiocchi | 152/552 |
| 3,085,616 A | 4/1963 | Smith et al. | 152/355 |
| 3,118,482 A | 1/1964 | Beissner | 152/542 |
| 3,503,829 A | 3/1970 | Menell et al. | 156/133 |
| 3,506,052 A | 4/1970 | Wittneben | 152/361 |
| 3,509,929 A | 5/1970 | Delobelle | 152/354 |
| 3,628,586 A | 12/1971 | Curtiss | 152/354 |
| 3,770,041 A | 11/1973 | Abbott | 152/356 |
| 3,780,783 A | 12/1973 | Curtiss, Jr. | 152/356 |
| 3,888,292 A | 6/1975 | Menell et al. | 152/542 |
| 4,096,899 A | 6/1978 | Kitazawa et al. | 152/354 |
| 4,735,249 A | 4/1988 | Kabe et al. | 152/542 |
| 4,782,880 A | 11/1988 | Staab | 152/542 |
| 5,361,820 A | 11/1994 | Adachi | 152/554 |

FOREIGN PATENT DOCUMENTS

| | | |
|---|---|---|
| EP | 0590482 | 4/1994 |
| FR | 1561130 | 2/1969 |
| GB | 1090161 | 11/1967 |

OTHER PUBLICATIONS

PCT International Search Report dated Jul. 29, 1998.

*Primary Examiner*—Geoffrey L. Knable
(74) *Attorney, Agent, or Firm*—David L King

(57) ABSTRACT

A method and article of manufacture is disclosed describing a technique to make a tire having at least one ply having a geodesic cord path.

6 Claims, 11 Drawing Sheets

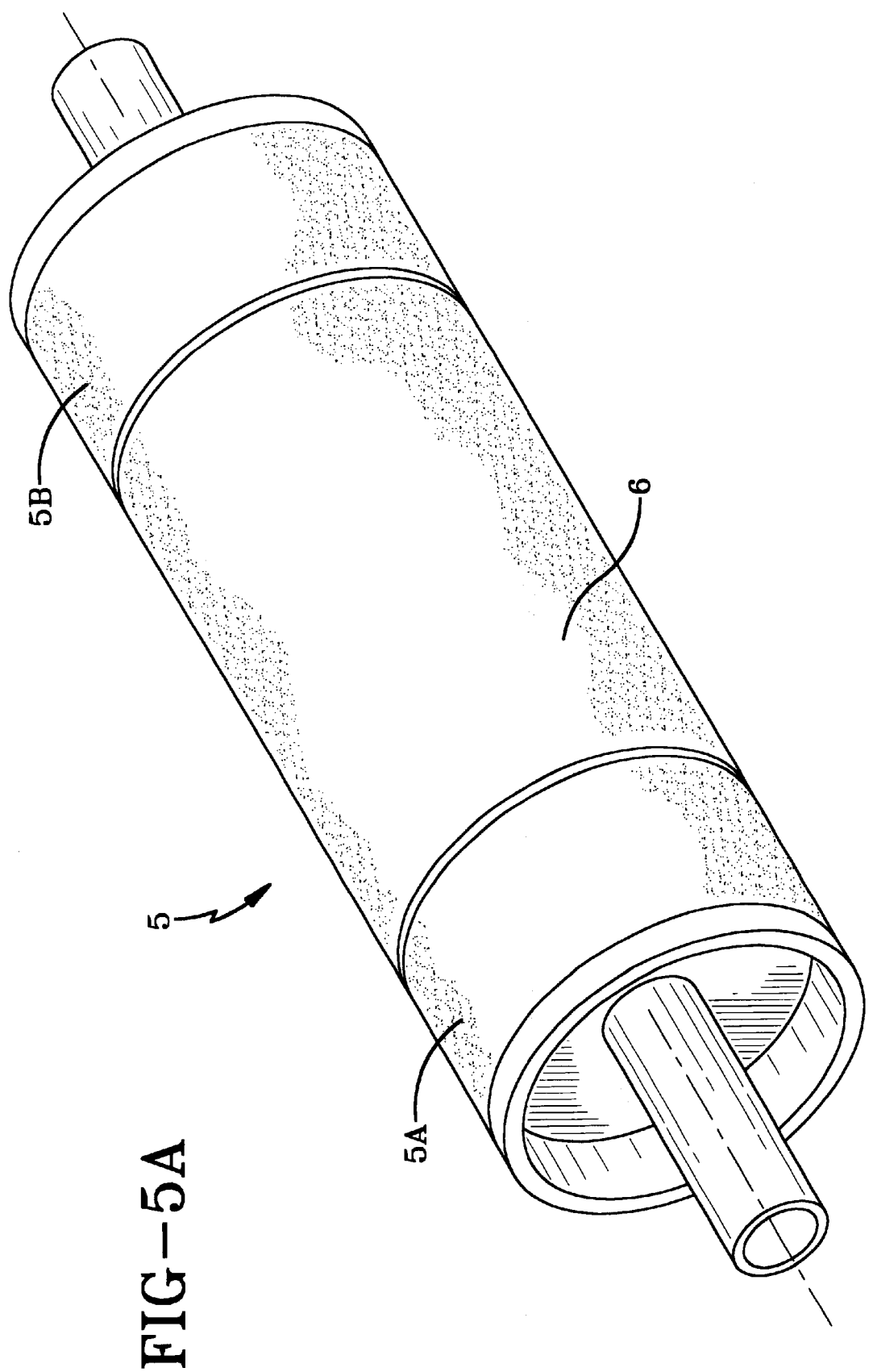

TIRE HAVING A GEODESIC PLY AND A METHOD OF FABRICATING

This is a Continuation, of application Ser. No. 09/077,642, filed May 28, 1998, now U.S. Pat. No. 6,068,821, which is a 371 of PCT/US98/06301 filed Mar. 27, 1998, of Dale Kenneth Dyer, Randall Raymond Brayer and Amit Prakash for "TIRE HAVING A GEODESIC PLY AND A METHOD OF FABRICATING".

TECHNICAL FIELD

This invention relates to a pneumatic tire more specifically to a geodesic tubeless type tire and a method of manufacturing such a tire.

BACKGROUND ART

Geodesic Tires are those tires whose ply cord paths are geodesic lines on the tire surface. John F Purdy, the author of Mathematics Underlying the Design of Pneumatic Tires, copyrighted in 1963, was the Chief Mathematician of the Development Department of The Goodyear Tire & Rubber Company and for 45 years he devoted his life to the mathematics underlying tire design. In Chapter IV of Mr Purdy's book, the entire subject matter discloses the principles of Geodesic tires. The author notes his interest in the geodesic cord path first occurred in 1917 as a student of mathematics. Experiments with geodesic tires first began about 1924.

Purdy discloses that a geodesic tire has many desirable features. Quoting Purdy at page 85 of the book "Its durability is excellent due to the absence of shear forces that in conventional tires result in a separation of rubber from fabric and that contribute to fabric fatigue through the torsion of the cords about their own axis during the shear cycle as the tire flexes. The absence of these same shear forces lower the operating temperature of a geodesic tire from the temperature of conventional tires. Improved durability in the vicinity of the tire bead results from the relatively small angle a at which the cords approach the bead. In many types of tire subject to large driving torque or to severe brake action, damaging torque buckles appear in the tire sidewalls. These are virtually absent in geodesic tires.

Due principally to the large cord angle over the crown, the geodesic tires provide a very soft ride at inflation pressures common to conventional tires of the same size. The same large cord angle over the crown reduces the lateral stability of the tire somewhat, and its ability to develop lateral thrust against the road when rounding a curve. This in itself might be a serious score against the geodesic tire if it were not for the fact that if inflation pressure is raised to the point where softness of ride approaches that of a conventional tire, lateral stability and cornering ability are as good or better than those of a conventional tire.

The geodesic path represents a long step forward in providing desirable properties in a tire that are possible for design alone to provide.

Geodesic tires have not become commonly known to users of tires largely because they require different procedures in the building of the tire than are required for the easily built conventional tires, and because of the fact that for normal purposes conventional tires are highly satisfactory products. The increasing range of conditions under which tires now operate demands new thinking in the art of design and tires of nonconventional cord path is one of the most important forward steps in meeting unusual requirements. Unfortunately the term geodesic has been flaunted in public in recent time with reference to tires that have no semblance whatever to geodesics. For the term geodesic is a mathematically precise term and a path or a curved surface departing only a little from a geodesic path easily loses the merits of geodesics. The failure to obtain a geodesic path in a tire is often the failure to understand some of the simple mechanics of tire construction.

Therefore, to obtain a given geodesic path in a tire, conventional building practice could be followed if the cord path in the flat ply were that path which pantographic action together with the effect of a prescribed tension would transform to a geodesic path on shaping from building form to mold.

The results of this reasoning have invariably been tires with perfect geodesic paths, conforming perfectly to the requirements that $\rho \cdot \cos\alpha = a$ constant, $\rho_0 \cos \alpha_0$, that cord tension be uniform over the entire cord path, and that shear stresses due to inflation pressure be zero"

Purdy then goes on to describe numerous attempts to build experimental geodesic tires a brief excerpt of this background art is given starting at page 91.

"The earliest geodesic tires, and some for later experiment, were built by laying cords or groups of cords along a template whose shape was that of the necessary cord path in the flat ply.

The resulting tires were highly satisfactory for experiment. A number of machines have been subject to patent and operate to wind a continuous cord on a core not far different in shape from the finished tire. The same machines could wind a continuous cord in a geodesic path on a building drum. The simultaneous motion of the guide that feeds the cord onto the core and the turning of the core make it possible for the cord to be laid to any prescribed path. The difficulty in this process arises from two principal reasons. To wind a continuous cord back and forth over a building form requires either that the cord path approach the bead along a line tangent to the bead circle or else a sharp reversal of direction of the winding mechanism if the angle of the cord at the bead circle is greater than zero. In either case, the tension in the cords necessary for a satisfactory shaping and curing the tire is very difficult to attain. The continuous winding of a cord also involves an overlapping of successive winds in the region of the bead. This also involves poor tension control and the added problem of an unreasonably large bead bulk. An alternative is to continue the winding to some circle of radius less than that of the bead circle and then cut the cords at some $\rho$ that will allow a turn of the ply around the bead. This last is not an economical procedure however.

Next in the line of planning non-conventional cord paths was the type of machine in which plies of fabric were used that had been prepared in the conventional manner, the cords of each ply lying in straight and parallel paths, the angle $\beta$ being the, required $\beta$ at the center line of the ply that was to become a geodesic path ply in the tire. The edges of the ply were seized by rings rotating on the same axis as that of the building form, and that held the ply at first just off the drum. As rollers pressed the ply onto the building form beginning at the center-line of the ply and moved from center-line toward the edges of the ply, the rings in which the ply-edges were held rotated independently of the rotation of the drum and of each other and in a manner prescribed to alter the cord angle continuously as the roller pressed the plies onto the building form, with the result that the cords of the ply lay in paths on the drum surface that would become geodesic plies in the shaped tire. Such a procedure was, of course, not confined to geodesic path tires but could, by prescribed rotation of the building drum and the side rings lay any desired path on the drum."

A cord is limited in its effort to adjust its position to make its tension uniform due to the modulus of rigidity of the rubber around it; and a tension appropriate to move the cord to its shortest path is not the same tension for all increments. There is, therefore, at best, a very large difference between the irregular path assumed by the cord and a geodesic path between its terminal points. Repeated experiments over a long period of years have always been with the same unsatisfactory results.

Now suppose the plies of a tire were lubricated with some compound that would remain a very slippery medium between plies during the shaping process but would be absorbed during cure to permit a satisfactory adhesion between plies of the finished tire. After computing the conditions of cord angle, cord length, and radial angle $\psi$ most favorable to the formation of a geodesic path by adjustment of the tire cords over the slippery ply surfaces, several attempts were made to form geodesic paths. The lubricants used were first zinc stearate or stearic acid in liberal quantities. For still more slippery surfaces castor oil was used. Both rayon and nylon cords were used in the several experiments.

The most favorable conditions for success were the following. A geodesic path was selected for the tire and the length of the path and the radial angles subtended by the cord path were computed. To subtend the same radial angle $\psi$ on the building drum and the length of cord path differing from that in the tire only by an amount that would permit a reasonably large tension on shaping from core to mold, the width of the building drum and the bias angle of the ply were determined. Purdy goes on to say at page 95, under these ideal conditions for compelling a cord in a ply to seek a geodesic path in the tire, not one of numerous experiments came anywhere near the geodesic path. At tread center a difference of the order of 20° existed between the path obtained and the geodesic. At the bead, the difference was of the order of 15°. Furthermore the paths obtained were irregular and uncontrollable from time to time and from ply to ply. Not only are there sound theoretical reasons why the cords act as they do; the compelling fact is that experiment after experiment proves it to be true."

Rarely do the inventors of a new concept have such a wealth of background information regarding their invention. Purdy both explains the practical and theoretical value of geodesic tires. He goes on to explain that simple methods to achieve such a geodesic tire have reportedly met with failure primarily due to the inability to replicate the product.

Luigi Maiocchi, an Italian inventor, disclosed in U.S. Pat. No. 3,062,258 a tire having a central geodetic disposition of ply cords and two lateral portions including the bead and sidewall in which the cords form a substantially crossed structure.

To Purdy this hybrid tire would have been one of many issues of the term "geodetical".

Nevertheless, Maiocchi did contribute an insight into the complexity of fabricating such a theoretically pure tire as a geodesic tire.

The present invention described hereinafter can be repeatedly built and tests indicated that the tire has achieved a consistent mimic of the geodesic plycord path from near the bead cores through the sidewall across the crown to the opposite bead cores. In one embodiment of the invention experimental race tires were built that survived durability testing over two hours at 239 mph, the tire being lighter in weight and substantially more durable than the prior art control tire.

SUMMARY OF THE INVENTION

The method of making a geodesic tire has the steps of cylindrically forming a ply onto a tire building drum, the ply reinforced with cords, the cords being oriented parallel and at a constant bias angle of θ; positioning a pair of bead cores spaced at a fixed axial distance (1) over the ply, each bead core having an axis coincident with the axis of the building drum thus forming a cylindrical carcass subassembly; inflating the carcass subassembly while having at least one bead portion, preferably both bead portions to move relative to the opposite bead portion reducing the shear tension in each ply cord, resultant cord path between the bead cores being substantially geodesic; sticking the ply ends to the partially inflated carcass to a radially outer location and applying two or more belt reinforcing layers over the carcass at least partially covering the ply ends.

The method may further include the step of placing or attaching a cord reinforced strip onto the ply adjacent the location of the bead cores, the strip having cords having a tensile strength greater than the ply cords and the cords of the strip being oriented at an angle β, β being less than θ.

The resultant tire will have a ply path that approximates the geodesic path wherein $\rho\cos\theta$ substantially equals a constant from bead to bead.

The preferred embodiment tire has a cord reinforcement strip that insures a lower angle in the bead region is achieved than the prior art tires of Maiocchi et al. Furthermore the fact that the tire is a low profile tire having an aspect ratio of less than 65% means that the cord angles are in fact substantially more closely following the approximation of the geodesic path than the earlier attempted prior art tires.

BRIEF DESCRIPTION OF DRAWINGS

FIGS. 5A–5G are perspective views of a tire carcass going through the various steps of assembly according to the preferred method of assembly according to the invention.

DETAILED DESCRIPTION OF THE INVENTION

Figure 1:
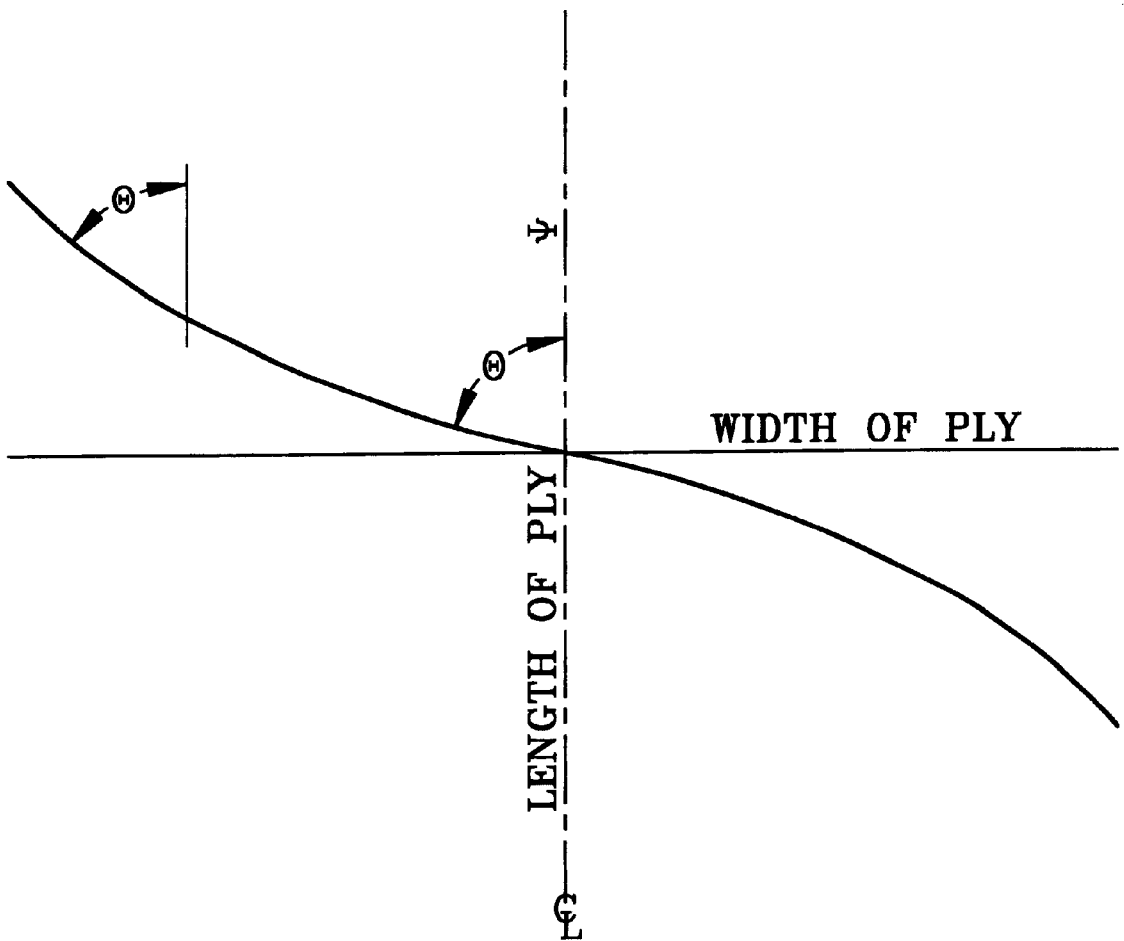
FIG. 1 is an example of a typical cord path in a shaped geodesic ply of a tire.

With reference to FIG. 1, the geodetical cord path has a progressively changing angular orientation. At the central region of the tire, the cords are substantially radial or at least more so. As the cord extends over the shoulder region, the angularity has a pronounced increasing bias angle creating a somewhat more circumferential cord orientation. As the observer will readily note the orientation is generally equal but opposite one shoulder relative to the other shoulder region. This intuitively creates a transition of cord angles between the ply and the restriction belt layers that unlike a pure radial or 90° cord path of a ply abutting against belt cords oriented at 22° the geodetic cords are slightly biased at about 50° to 85°. The tire engineer has an objective to optimize the shape of the contact patch or footprint of the tire for wear. In low aspect, ratio tire of 70%, preferably 65% or less, engineers are finding advantages of squaring or making the leading and trailing edges as nearly perpendicular to the direction of travel as possible. At the shoulder regions; the contact patch is always curved. The geodetical cord path, by changing its inclination to an increasing bias angle, seems to allow the cord to enter and leave the footprint area without the same localized shear stresses of a conventional bias or a radial tire. These features are not clearly or fully understood, however, it is believed that high stresses due to the flexure in the area below the belt edges can lead to localized separation of belt from the ply. The geodetical tire appears to greatly reduce the phenomena. As the cord ply path continues along the sidewalls toward the bead cores the bias angularity tends to increase, this creates both opportunities and problems for the tire designer. In a geodetical single ply tire, the ply cords on the first sidewall are oppositely oriented relative to the second sidewall. This asymmetry must be offset. Prior art solutions were to use multiple plys or as Maiocchi et al taught an envelope turnup that extended along each sidewall to under the belts was used. The primary drawback of Maiocchi et al's approach was that the turnup portion was accomplished prior to inflating the uncured carcass during the building process. This meant that in the sidewalls the ply and the turnup cords were simply bias angled. There was no tire geodetical effect in that region. This arguably meant that the shoulder regions were really just bias angled because the turnup tended to lock in the cord angles.

The invention described herein solves this problem in two unique ways insuring a substantially more geodesic cord path is achieved.

Figure 5B:
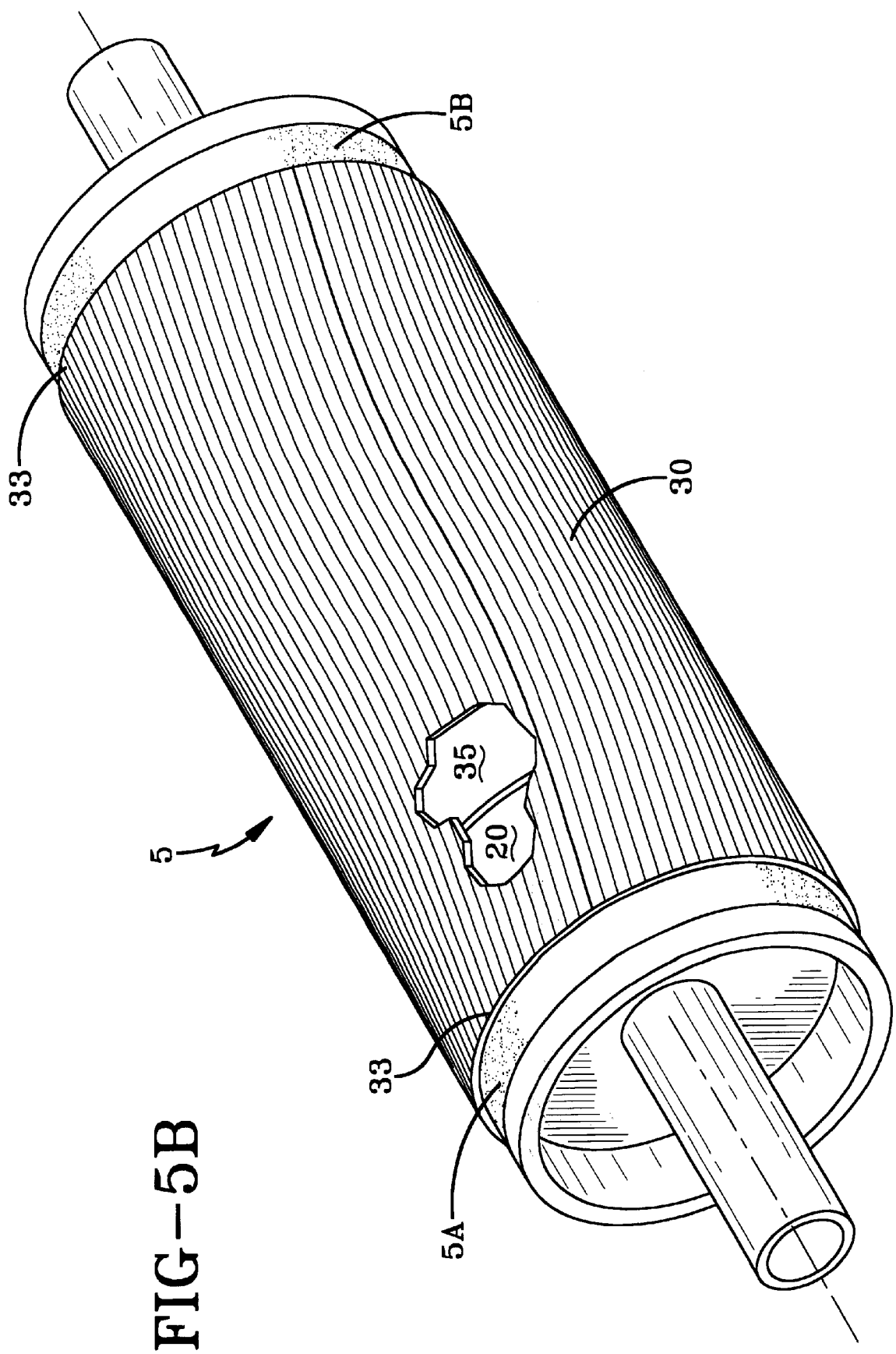
Figure 5C:
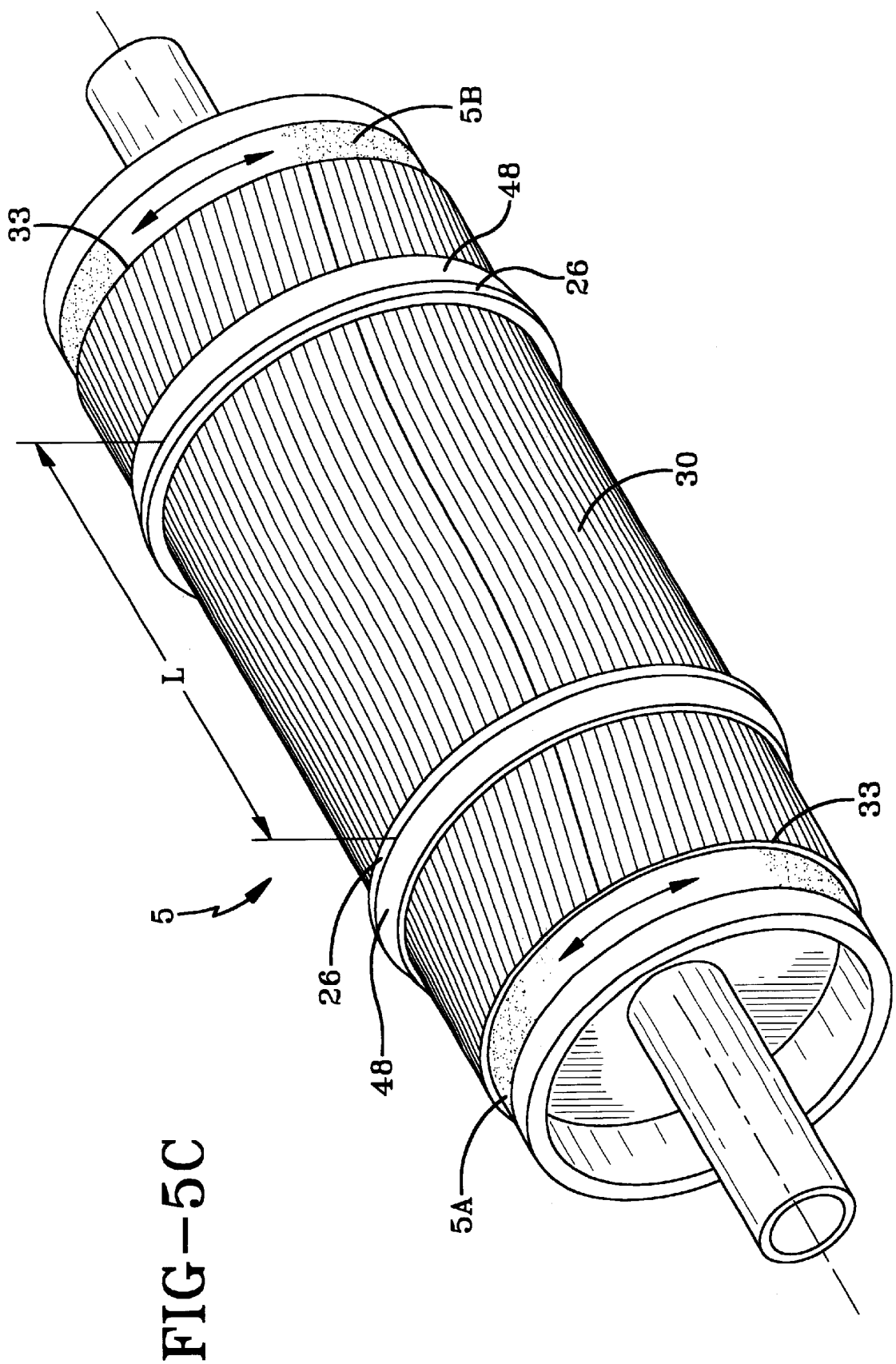
Figure 5D:
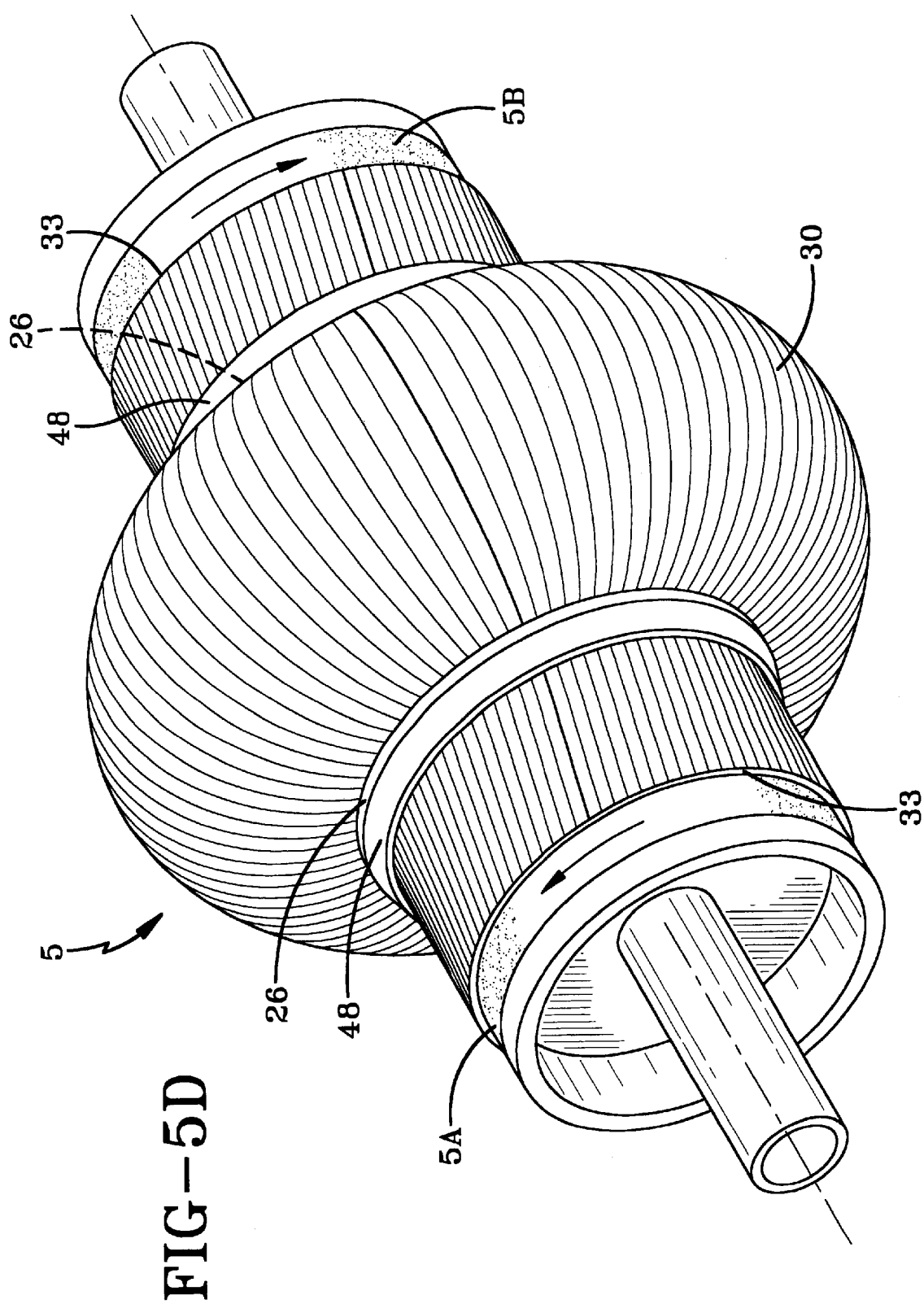
Figure 5E:
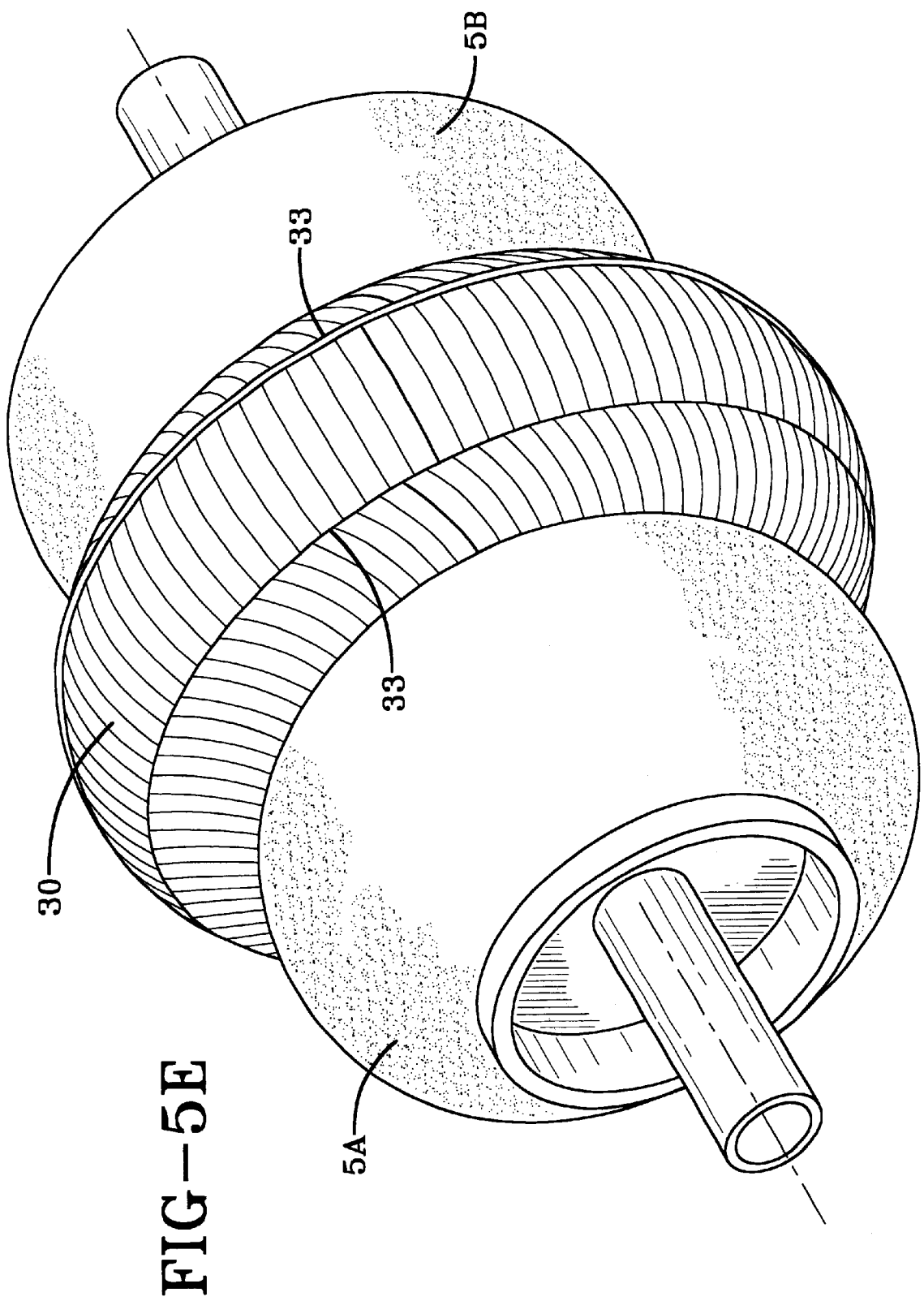
Figure 5F:
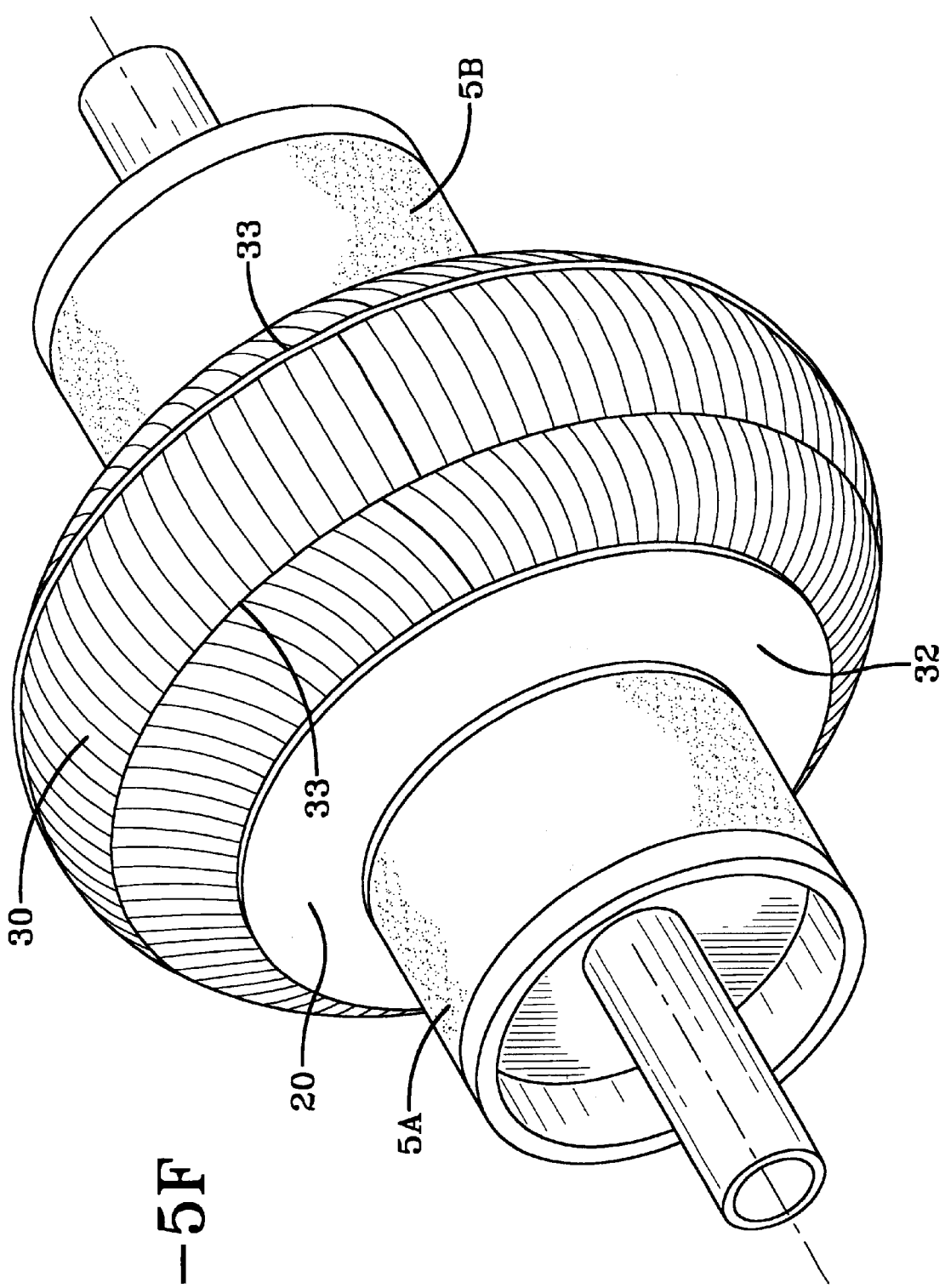
Figure 5G:
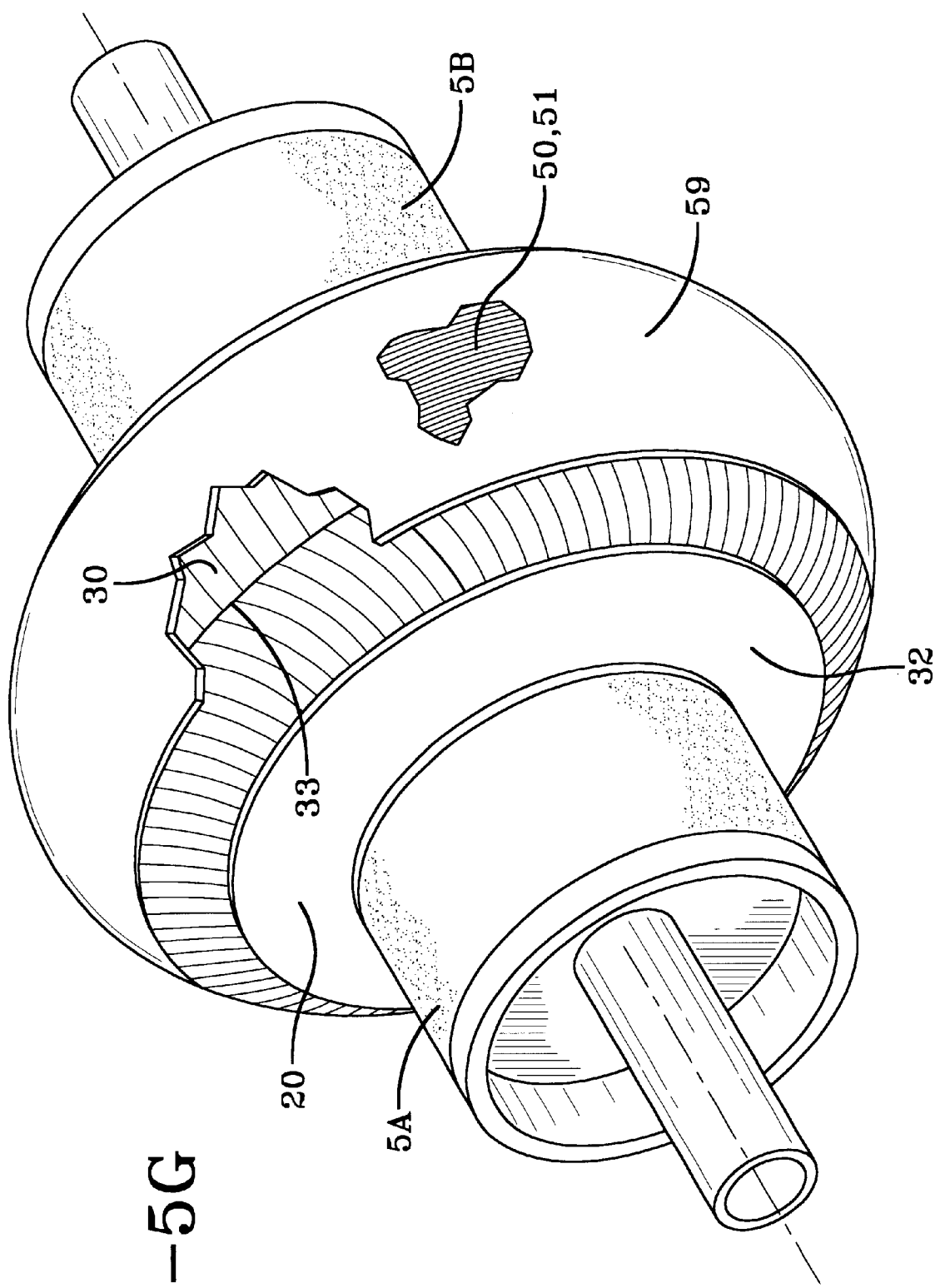

The most preferred way to achieve this result is shown in FIGS. 5A–5D. The bias ply 30 is first cylindrically stitched to the building drum 5 as shown in FIG. 5B. Then the bead cores 26 are slipped over both ends 33 of the ply 30. The spaced distance between the beads 26 establishes the cord length L as shown in 5C. Then the first bead core 26 and ply 30 are moved by rotating one or both building drum ends 5A, 5B from the initial position to a second location which is substantially equal to the final path intersection at the location of the beads 26 that a true geodesic curve will take. As the building drum bladder 6 is inflated as shown in FIG. 5D the rotation of the bead cores 26 and plies 30 should be accomplished either just prior to or simultaneously as the carcass is being torodially shaped by the building drum bladder. Once this is accomplished, the turnup ends 33 are stitched to the inflated carcass as shown in FIG. 5E and 5F. Then the belt layers 5, 51 are attached to the carcass in the crown area as further illustrated in view 5G. The turnup ends 33 and the belt layers 50, 51 when stitched to the ply 30 naturally help hold the ply cord paths fixed to the preferred geodesic path.

Figure 2:
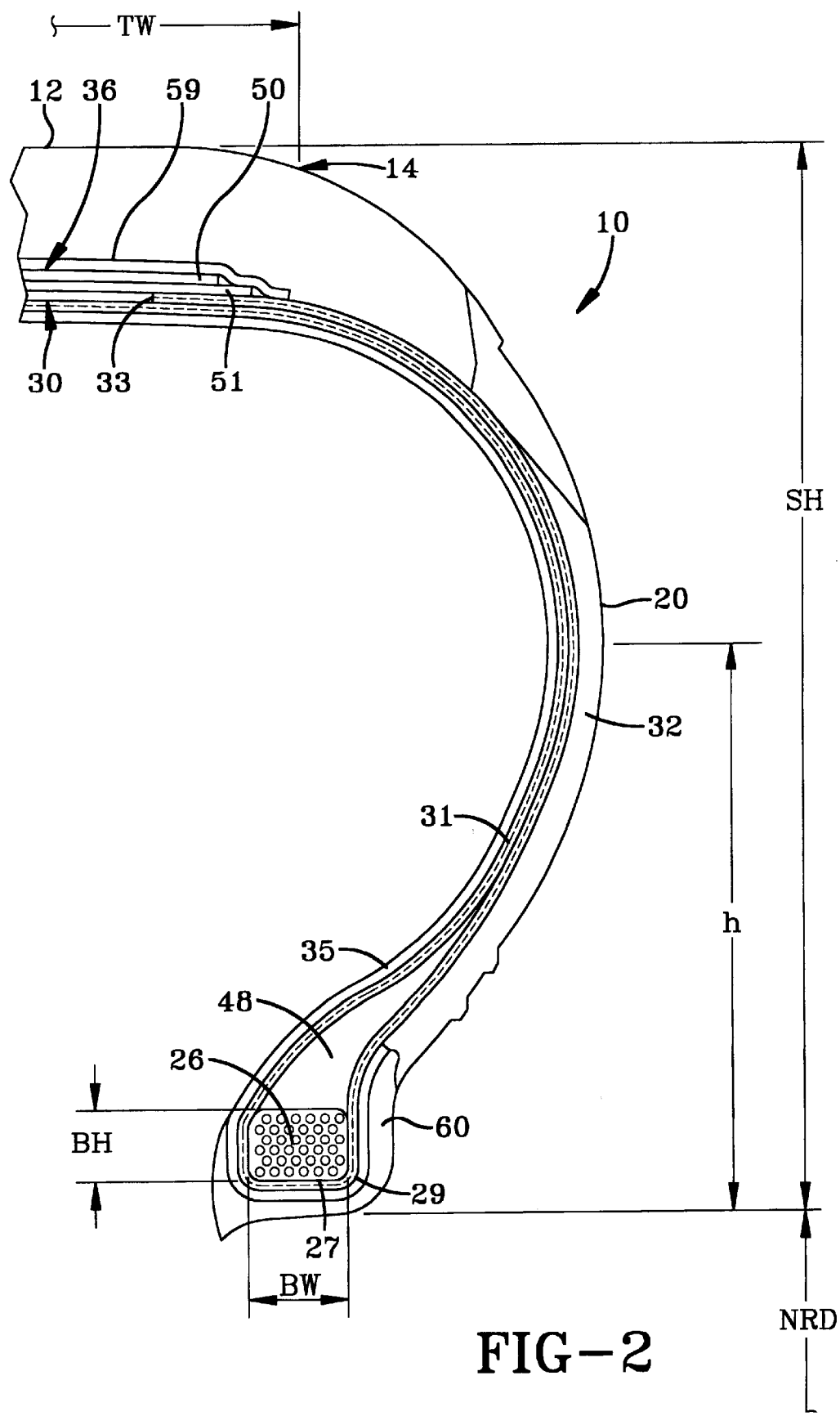
FIG. 2 is a cross-sectional view of a first embodiment tire 10 of the present invention.

In FIG. 2 a partial cross-sectional view of the preferred embodiment tire 10 is shown. The tire has a nominal rim diameter NRD and a section height SH, the location of the maximum section width is shown at radial location L.

The tire 10 has an elastomeric tread 12, a pair of lateral tread edges 14, the distance between the lateral edges defining the tread width TW. As shown radially inward of the tread is an overlay 59 and a belt reinforcing structure 36, the belt structure 36 has two layers 50, 51.

The tire 10 has a carcass 20. The carcass has a ply 30 extending from a bead core 26 to an opposite bead core 26 and wrapping around each core 26 and extending radially outward to a turnup end 31 under the belts 50, 51. In air impervious liner 35 is radially inward and adjacent the ply 30. An elastomeric sidewall 32 covers the ply turnup 33 as shown. A toe guard fabric strip 29 and a hard rubber chaffer 60 is further shown.

The bead core as shown has a bead height BH extending from a flat base 27. The tire 10 as shown has the ply cord 31 between the bead cores 26 oriented in a substantially geodetic path established by the above-described method.

Figure 3:
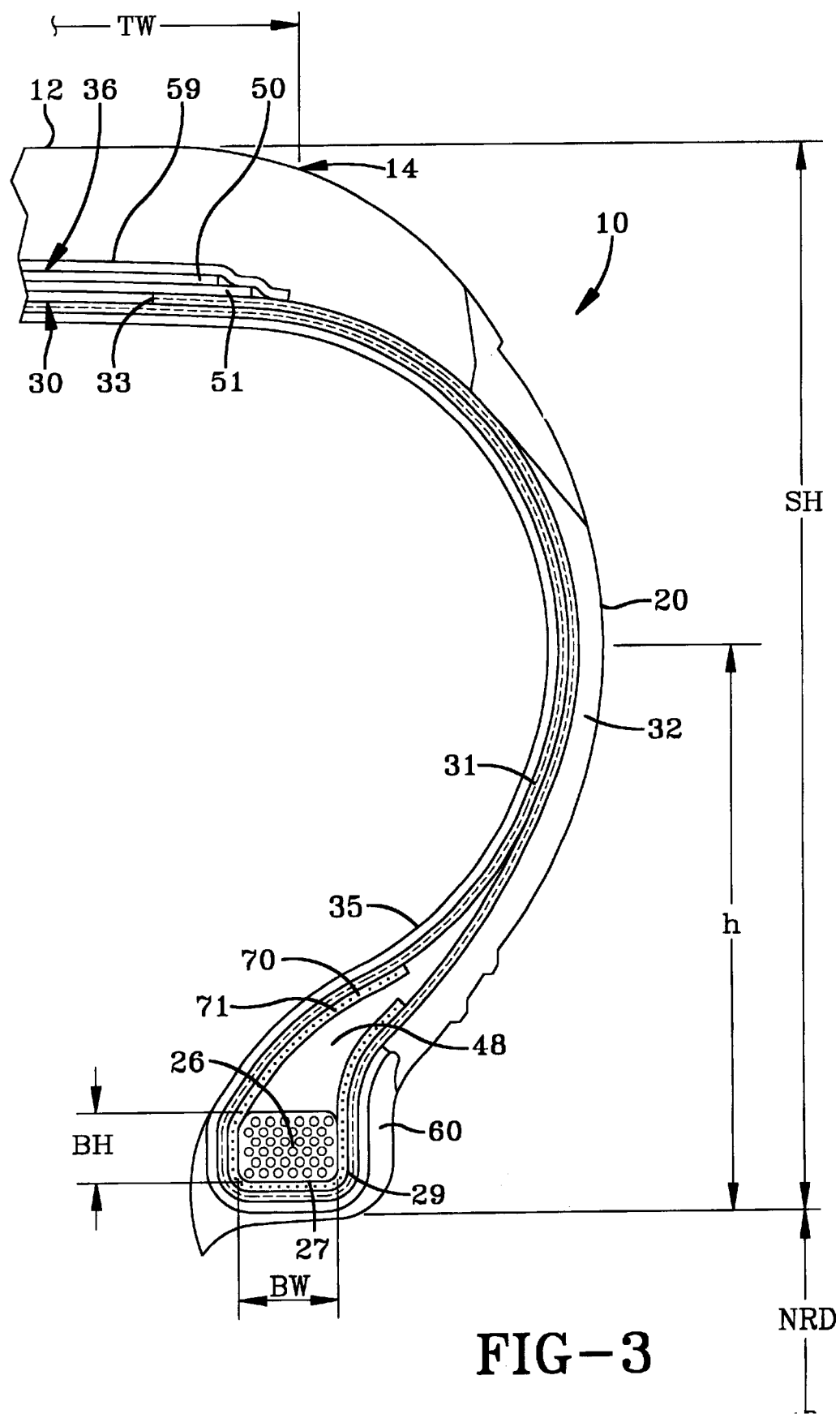
FIG. 3 is a cross-sectional view of a second embodiment tire 100 of the present invention displaying a cord reinforcement strip in the bead region of the tire.

In FIG. 3 a second embodiment tire is shown with an alternative method of simultating the geodesic ply path. To construct this tire carcass on the building drum one cylindrically forms the green or uncured bias ply 30 having cord angles in the range of 50° to 85°, preferably 70° to 80°, and in each location of the pair of beads 26 attaches a cord reinforcement strip 70 having parallel cords 71 oriented at about 45° and having a tensile strength greater than those of the ply cords. The width of the strip preferably is sufficient to extend on at least the ply side, the region of the ply located between the two bead cords 26, a distance between 25% and 50% of the section height of the tire. It is preferred that the orientation of each strip 70 is similarly directed relative to the ply cords 31 in each region of the beads. When the turnup 33 is achieved in this case, it can be done while the carcass 20 is being inflated as described above. Alternatively, the turnup 33 can be made, prior to inflation. While this introduces some of the problems noted in the prior art tire, the low angle cord reinforcement 70 takes the tension forces transmitted from the tread region 12 and absorbs this force due. to its higher tensile strength and lower percent elongation than the bias cords 31. This creates a somewhat compromised step-like cord angle approach to the geodetic profile in the bead region, but nevertheless achieves a 45° angle of the cords near the beads 26 effectively lowering the angular orientation of the structure over the prior art attempts.

As shown the turnup end 33 of the bias ply 30 extends outward to lie under the belt edges. Alternatively, the turnup ends 33 can be truncated in the region nearer to the bead cores 26 typically at about 25% of the section height of the tire. The high turnup end 33 commonly referred to as a "envelope turnup" is advantageous when very high-speed performance is required.

Test tires employing the geodetic ply 30 with the cord reinforcement strips 70 were conducted. The plys 30 were made with nylon cords 31; the cord 71 of the reinforcement strip 70 was made of aramid. The belts 50, 51 were layers of aramid cords. A nylon overlay 59 was placed radially outward of the belt layers 50, 51. The tire had an elastomeric apex or bead filler 48 made of hard rubber and the bead cores 26 were 6×6 strap beads using a steel monofilament wire. The test vehicle had four tires made according to the invention, the tires had an aspect ratio of less than 65%.

The conventional tires used in this application have two bias plies and as a result suffer a weight penalty when compared to the same size tires of the present invention.

The test tires when made with a ply having cord angles of 77° uncured ply and 45° uncured reinforcement strips when cured had ply cord angles at the equatorial centerplane of 82° to 84° at the belt edge, the ply cord path was about 67° and at the bead about 65° and the ply turnup had a cord angle of 67°. The cord reinforcement strips 70 had cured cord angles of 53°. It is understood that the cord angles on one side of the tire were similar at similar locations, but opposite in hand. These test tires experienced the rotation of the ply 30 and beads 26, but with the turnup stitched prior to inflating the green carcass. While this limits the ability to maintain the pure geodesic path along the lower sidewall the use of the cord reinforcement strips 70 with higher tensile strength cords 71 than the ply cords 31 draws both the ply cords 31 and the reinforcement strips cords 71 to a transitional angular arrangement very closely approximating this desired geodesic cord path.

The beneficial features of the cord path are achieved in part because low aspect ratio tires have relatively short sidewalls 32 when compared to their earlier predecessor bias tires. This means that the geodesic cord path is effectively truncated at the intersection of the bead at a location along the path that has an angular orientation above 45°. This location has higher lateral stability than otherwise would be seen in higher aspect ratio geodetic type tires and accordingly has ride performance much like the radial tires that are so highly regarded for their superior ride performance.

While the above description of the methods of constructing this type of tire carcass seem simple to grasp one area that needs careful consideration is the effective cord length L between the bead cords must be predicted with consideration given to the mold shape and the amount of length needed to permit the cords to take the geodesic path. The use of bias angles in the ply 30 enable the length of the cord 31 to be greater than the distance between the bead cores 26. Furthermore, the bias angle tends to approximate the sidewall cord path so that as the beads 26 and ply move in an angular motion to achieve the optimal cord path there is very little resistance to the motion. The elastomeric ply coating simply conforms as the green or uncured carcass is inflated during the building process.

When first building the above mentioned test tires at least one of the inventors felt that the pronounced elongated "S" shape of the cord path was a mistake in that the path particularly in the shoulder regions deviated from a radial ply curvature. Attempts to reduce the "S" curved path across the crown of the carcass to a more radial orientation led to poorer performance. Allowing the curvature to naturally depart to the more geodesic path resulted in superior durability performance. Forcing the tire to be built in the desired geodesic profile achieves a very cool running low hysterisis tire ideally suited for high speed or runflat applications.

With this in mind the inventors contemplated, such tires would have wide use in applications such as commercial trucks, aircraft farm and light trucks and passenger tires. In any application a conventional radial ply tire is used, the single bias ply transformed into geodesic cord path could be superior in performance.

Figure 4:
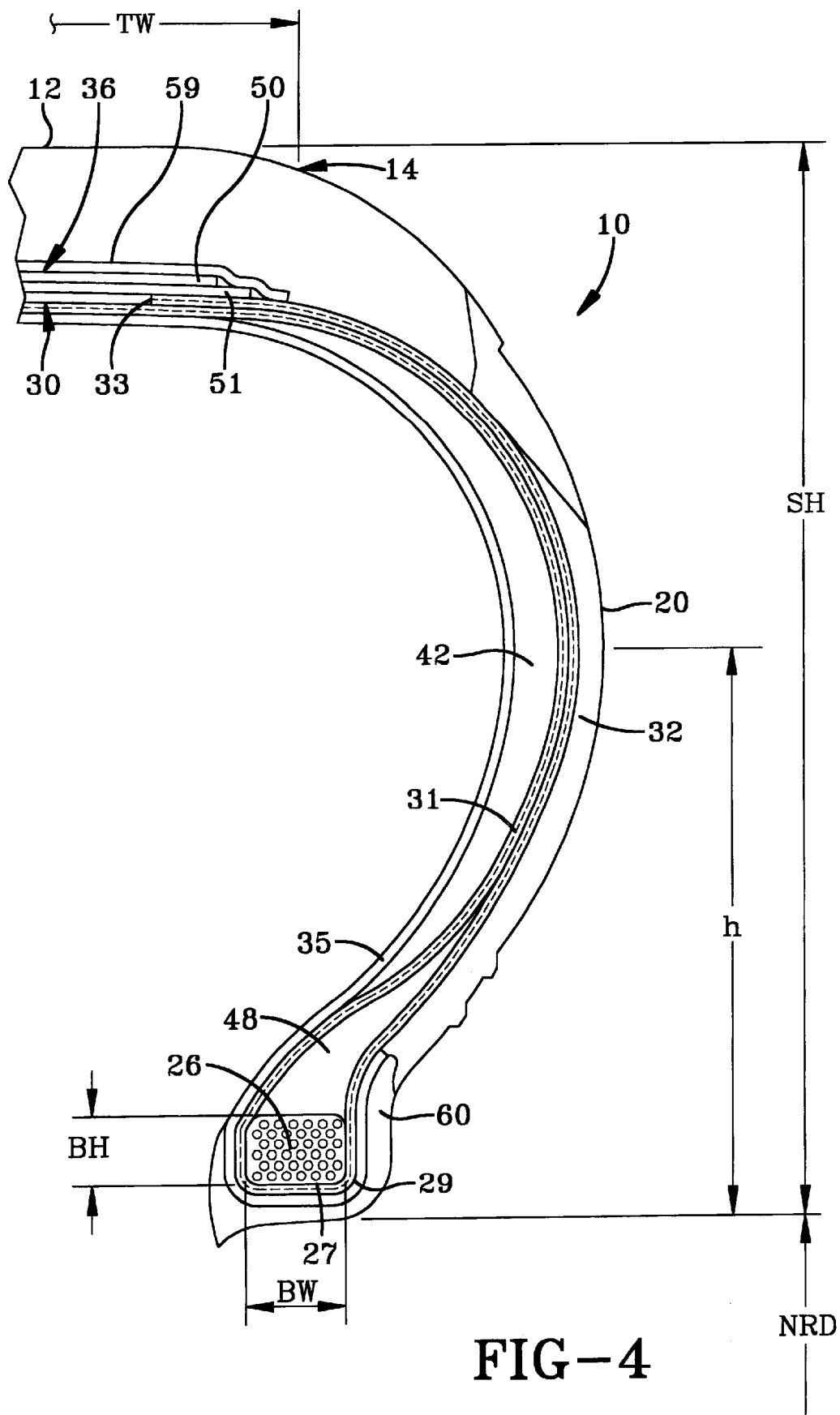
FIG. 4 is a cross-sectional view of a third embodiment tire 110 of the present invention displaying a run flat carcass.

In FIG. 4, one example of superior performance is a run-flat tire 10, which is made according to the inventing as previously described. One or preferably two sidewall inserts 42 could be inserted in each sidewall 20. The facilitation of the cord path movement can be best achieved if the inserts 42 are simply made elastomeric material without cords.

Such a tire would naturally run cooler at the shoulder region and would enable the run-flat tire 10 to be made using fewer components than the conventional radial ply type run-flat tire.

While it is understood that the geodesic tire is unique in it ply path from either a bias tire or a radial ply, it's cord path as measured in the crown area falls into the category broadly referred to as radial having an angle in the range of 65° to 90°. Interestingly the low aspect ratio geodesic tire is a very unique form of tire that could enhance the performance of the radial tire.

The use of a monopoly run-flat tire was recently disclosed in U.S. patent application Ser. No. 08/865,490, which is incorporated herein by reference. While that application teaches the use of a radial ply the conversion to a geodesic carcass using the novel methods described herein are fundamentally very sound.

While the test tire was disclosed as using a nylon ply, it is understood that rayon, polyester or any other synthetic cord material may be used. Furthermore, steel cords particularly fine diameter filaments of very high tensile strength can be used in some applications.

The belt layers 50, 51 could use steel, fiberglass, nylon, rayon, PEN or any other cord material.

Similarly the overlay 59 could be nylon, aramid, or rayon or any other material commonly used for that purpose.

In the case of the cord reinforcement strip 70, applications where it is desirable to use such an additional reinforcement, it should have cords 71 with a tensile strength at least 10% greater than the ply cords 31 tensile strength. In those cases, the cords 71 in the reinforcement strip 70 dominate the load bearing. As shown in FIG. 3 the strip cords 71 were oriented in the same direction as the adjacent ply abeit at a lower angle. Alternatively, the strip 70 adjacent the ply 30 can be oppositely oriented with the turnup portion of the strip 70 being similarly oriented relative to the ply 30. In that case, the load bearing transition portion tends to follow force lines along the turnup portion of the reinforcement strip 70 as the forces are transmitted down the sidewall 32.

A third possible combination is having the strips 70 on each bead core 26 parallel to each other. In that case, the geodesic ply path is parallel to the. strip 70 on one bead 26 and oppositely oriented relative to the strip 70 near the opposite bead 26.

All three of these approaches are believed feasible due in part to the generally high stiffness and rigidity of the carcass near the beads 26. Thus the lack of flexibility in this region makes it less sensitive to which orientation the reinforcement takes as long as it is closer to a 45° angular relationship than the geodesic ply 30 to which it is attached.

It will be appreciated by those of ordinary skill in the art that various modifications and material substitutions can be made without departure from the scope of the inventive method and article of manufacture as described and claimed.

What is claimed is:

1. A low aspect ratio pneumatic tire having an aspect ratio of less than 65% and having a belt structure and a carcass structure, the tire has a carcass structure having a pair of bead portions, each bead portion having a bead core, and a pair of sidewalls, one sidewall extending from each bead portion radially outwardly to a central portion, the carcass structure having a single ply, the single ply having bias angled parallel cords in the range of 70° to 80° prior to vulcanization, which after vulcanization the cords of the single ply achieve an orientation wherein the cords extend in an annular disposition having a progressively changing angular orientation wherein the cords are substantially radially inclined in the range of 82° to 84° in the central region of the tire, and as the cords extend over the shoulder region at the belt edge the angularity has a bias angle of about 67°, the orientation being oppositely inclined one shoulder relative to the other shoulder region, at each bead the cord angle being about 65° and the single ply being wrapped about the bead cores and having a ply turnup, the turnup extending radially outwardly at a substantially constant turnup cord angle of about 67° directionally opposite to the ply cord angle adjacent to the bead cores, and a cord reinforcement strip located adjacent each bead core, the cord reinforcement strip having parallel cords oriented at an angle $\beta$, $\beta$ being less than the ply cord angle of about 65° adjacent the bead cores; and wherein the belt structure has two or more cord reinforced layers extending circumferentially around the center portion of the tire carcass and radially overlapping a portion of each turnup end.

2. The pneumatic tire of claim 1 wherein the cords of the cord reinforcement strip having a tensile strength greater than the cords of the ply.

3. The pneumatic tire of claim 2 wherein the cords of the cord reinforcement strip are aramid.

4. The pneumatic tire of claim 1 wherein the cords of the ply are nylon.

5. The pneumatic tire of claim 1 wherein the belt structure has cords of aramid.

6. The pneumatic tire of claim 1 further comprising a fabric overlay disposed radially outward and adjacent to the belt reinforcing structure.

* * * * *